United States Patent Office 3,210,315
Patented Oct. 5, 1965

3,210,315
ACRYLIC FIBERS MADE FLAME RESISTANT WITH HALOGENATED ALIPHATIC ACID ESTERS
William A. Blackburn, Chapel Hill, and James R. Misenheimer, Raleigh, N.C., assignors to Monsanto Company, a corporation of Delaware
No Drawing. Filed Feb. 11, 1963, Ser. No. 257,740
26 Claims. (Cl. 260—31.2)

This invention relates to acrylonitrile polymers having improved properties. More particularly, the invention relates to imparting flame resistance to acrylontrile polymers by the use of halogenated aliphatic acid esters.

Acrylonitrile polymer compositions are useful in a wide variety of textile applications but are at a disadvantage in certain applications due to a lack of substantial flame resistance. To overcome this lack of flame resistance, it has been proposed to either copolymerize or blend acrylonitrile polymers with flame proof compositions or to treat the polymer after formation into fibers and filaments with flame proofing agents. For example, copolymerization of acrylonitrile with certain other monomers such as vinyl chloride or vinylidene chloride resulted in considerable improvement in flame resistance, but the product lacked dyeing affinity. Blends of acrylonitrile polymer compositions with polyvinyl chloride, polyvinylidene chloride, phosphonates and phosphates such as monoallyldialkyl phosphates and alkyloxypropene phosphonates and other flame resistant compositions produced fibers with good flame resistance, but such fibers suffered from either a lack of compatibility or permanence during fiber forming processes. This lack of compatibility was due to the vinyl chloride, vinylidene chloride or other flame resistant portion. Typical manifestations of this incompatibility would be revealed by a separation of spinning solutions into two liquid phases and the resulting fibers would be of inferior quality due to segmentation.

Accordingly, it is an object of this invention to provide acrylonitrile polymers, copolymers and blends having improved flame resistance and compatibility.

It is another object of the invention to provide a process for the incorporation of halogenated aliphatic acid esters into acrylonitrile polymers.

It is still another object of the invention to provide acrylonitrile fibers, filaments, and other shaped articles having improved flame resistance.

Still another object is to provide plasticizers for acrylonitrile polymers.

Other objects and advantages of the invention will become apparent from the description which follows hereafter.

Broadly stated, this invention comprises adding and intimately admixing flame retarding amounts of a halogenated aliphatic acid ester with acrylonitrile polymer compositions and thereafter extruding by conventional solution spinning the flame retarded polymeric compositions to form fibers and filaments having improved flammability characteristics.

The flame retardants of this invention are referred to as halogenated aliphatic acid esters and may be represented by the general formula

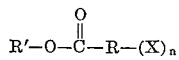

wherein R represents an alkylene radical containing from 8 to 22 carbon atoms, and R', of the alcohol or other ester forming component, contains from 1 to 8 carbon atoms, X represents a halogen and $n$ is an integer of from 2 through 10 inclusive. The halogen portion of the flame retardant preferably consists of either chlorine or bromine. Iodine and fluorine have been found to be unsatisfactory, both from an economic and from a compatibility standpoint. The amount of halogenation of these esters will, of course, vary with the type of compound employed. However, in general, it may be stated that from 4 to 6 chlorine or bromine atoms per molecule will commonly be employed although the total number of chlorine or bromine atoms per molecule may vary from around 2 to as high as 10 per molecule depending on the total number of carbon atoms in the acid radical portion of the ester molecule. As typical examples of the halogenated aliphatic acid esters of this invention, there may be mentioned methyl pentachlorostearate, ethyl pentachlorostearate, methyl hexachlorostearate, ethyl hexachlorostearate, ethyl octachlorostearate, methyl octachlorolaurate, ethyl octachlorolaurate, methyl pentabromostearate, ethyl pentabromostearate, n-propyl hexabromostearate, methyl octabromostearate, methyl tetrabromolaurate, glycerol tripentachlorostearate, methyl octachlorostearate, methyl decachlorolaurate, and other esters which have been chlorinated or brominated in varying degrees such as methyl caprylate, methyl pelargonate, methyl caprate, methyl hendecanoate, methyl tridecanoate, methyl myristate, methyl palmitate, ethyl caprylate, ethyl laurate, ethyl caprate, ethyl pelargonate, ethyl stearate, butyl caprylate, butyl laurate, butyl stearate, hexyl caprylate, hexyl laurate, hexyl stearate, octyl caprylate, octyl laurate, octyl stearate and the like.

The amount of retardant which may be employed in the practice of this invention may be any amount sufficient to achieve the desired result dependent upon the concentration of halogen in the retardant, with the concentration of polymer and various spinning conditions. In general, the retardants are used in an amount which may vary from 0.5 to 8 percent, preferably 1 to 5 percent based on the weight of the solution. Based on the weight of the fiber, the amount of flame retardant may vary from 4 to 20 percent. The method of addition involves preparing a spinning solution containing polymer, solvent, halogenated aliphatic acid ester and any other product improving agents that it may be desirable to have at this point in the process. The various ingredients are thoroughly mixed and will show complete compatibility insofar as the compatibility of the halogenated aliphatic acid esters with the various polymer compositions is concerned.

The acrylonitrile polymers of this invention include polyacrylonitrile and copolymers, terpolymers, interpolymers and blends of acrylonitrile with other polymerizable mono-olefinic materials as well as blends of polyacrylonitrile and such polymerized mono-olefinic materials with small amounts of other polymeric materials such as styrene. In general, a polymer made from a monomeric mixture of which acrylonitrile is at least 70 percent by weight of the polymerizable content or a blend of polymers containing at least 70 percent of polymerized acrylonitrile is useful in the practice of the invention. Block and graft copolymers of the same general type are within the purvue of the invention.

For example, the polymer may be a copolymer of from 80 to 98 percent acrylonitrile and from 2 to 20 percent of another monomer containing the $>C=C<$ linkage and copolymerizable with acrylonitrile. Suitable mono-olefinic monomers include acrylic, alpha-chloroacrylic and methacrylic acids; the methacrylates such as methyl methacrylate, ethyl methacrylate, butyl methacrylate octyl methacrylate, methoxymethyl methacrylate, beta-chloroethyl methacrylate, and the corresponding esters of acrylic and alpha-chloroacrylic acids; vinyl chloride, vinyl fluoride, vinylidene chloride, 1-chloro-1-bromoethylene; methacrylonitrile; acrylamide and methacrylamide, alpha-chloroacrylamide or monoalkyl substitution products thereof; methyl vinyl ketone; vinyl carboxylates such as vinyl acetate, vinyl chloroacetate, vinyl propionate and N-vinylsuccinimide; methylene malonic esters; itaconic ester; N-vinylcarbazole; vinyl furane; alkyl vinyl ethers; vinyl sulfonic acid; ethylene alpha-, beta-dicarboxylic acids or their anhydrides or derivatives such as diethyl fumarate, diethyl maleate, diethyl citraconate, diethylmesaconate; styrene; vinyl naphthalene; acenaphthalene; vinyl-substituted tertiary heterocyclic amines, such as the vinylpyridines, for example, 2-vinylpyridine, 4-vinylpyridine, 5-methyl-2-vinylpyridine, etc., 1-vinylimidazole and alkyl-substituted 1-vinylimidazoles, such as 2-, 4-, or 5-methyl-1-vinylimidazole, and other >C=C< containing copolymerizable materials.

The polymer may be a ternary interpolymer, for example, products obtained by the interpolymerization of acrylonitrile and two or more of any of the monomers enumerated above. More specifically, a useful ternary polymer comprises acrylonitrile, methacrylonitrile, and 2-vinylpyridine. The ternary polymers may contain, for example, from 80 to 97 percent of acryonitrile, from 1 to 10 percent of a vinylpyridine or a 1-vinylimidazole, and from 1 to 18 percent of another substance, such as methacrylonitrile or vinyl chloride.

The polymer may also be a blend of from 50 to 98 percent of polyacrylonitrile or of a polymer containing from 80 to 99 percent acrylonitrile and from 1 to 20 percent of at least one other >C=C< containing substance copolymerizable with acrylonitrile, with from 2 to 50 percent of a blending polymer of from 10 to 70 percent of acrylonitrile and from 30 to 90 percent of at least one other >C=C< containing polymerizable monomer. Preferably, when the polymeric material comprises a blend, it will be a blend of (1) a copolymer of 90 to 98 percent of acrylonitrile and from 2 to 10 percent of another mono-olefinic monomer such as vinyl acetate, with (2) a sufficient amount of a copolymer of from 10 to 70 percent of acrylonitrile and from 30 to 90 percent of a vinyl-substituted tertiary heterocyclic amine, such as vinylpyridine, methyl vinylpyridine or 1-vinylimidazole, the two blending polymers being so as to give a dyeable blend having an overall vinyl-substituted tertiary heterocyclic amine content of from 2 to 10 percent based on the weight of the blend. Other blend compositions such as blends of polyvinyl chloride or polyvinylidene chloride with the above described blends, the overall blending composition containing at least 70 percent polymerized acrylonitrile are also within the purvue of the invention.

The polymers useful in the practice of the present invention may be prepared by any conventional polymerization procedure, such as mass polymerization methods, solution polymerization methods, or aqueous emulsion procedures. The preferred practice utilizes suspension polymerization wherein the polymer is prepared in finely divided form of immediate use in the fiber fabrication operations. The preferred suspension polymerization may utilize batch procedures wherein monomers are charged with an aqueous medium containing the necessary catalyst and dispersing agents. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer may also be employed.

The most effective polymers for the preparation of fibers are those of uniform physical and chemical properties and of relatively high molecular weight. The polymers should have molecular weights of at least about 10,000 and preferably between about 25,000 and 150,000.

In preparing the products of the present invention, conventional equipment ordinarily employed in the manufacture of artificial and synthetic fibers and filaments may be used and particularly the equipment which is usually employed in the manufacture of fibers and filaments from acrylonitrile polymers. The present invention is applicable to the usual methods for forming synthetic filaments and fibers, such as dry spinning, wet spinning and various combinations and modifications thereof. Any of the well known prior art solvents, coagulation baths and orientation and washing methods normally used in solution spinning of acrylonitrile polymers may be used in the practice of the invention. Heat and light stabilizers, such as dibutyltin oxide, phenol, hydroquinone and formaldehyde-organic metal sulfoxylate-inorganic acid combined agents, co-flame retardants such as antimony trioxide, anti-corrosive agents such as zinc oxide, delusterants and other like modifying agents may be incorporated with the polymeric compositions disclosed herein during spinning solution preparation or after extrusion and formation of the polymer into fibers without departing from the scope of the invention.

The process and compositions of this invention will result in acrylic fiber compositions having greatly improved flammability and better processing qualities due to compatibility of the flame retardants with the acrylic fiber composition. It has also been found that the improvement in flammability can be obtained by using approximately one-half the percent of bromine as of chlorine. In addition, co-flame retardants such as antimony trioxide and others may also be used if desired to further strengthen the flame resistance of these polymeric compositions. It has been determined that better retention of the retardants can be obtained with high polymer solids content, from 25 to 28 or even 29 percent polymer solids rather than with lower polymer solids contents, say from around 18 to 20 percent.

The flame retardants of this invention are retained to a much greater degree than those of the prior art. The amount of chlorine or bromine retained in the fiber is extremely high and may run as high as 95, even 98 percent. This means that on a fiber basis from 1 to 7 percent by weight of chlorine or bromine is present in the finished product. In contrast, many other well known flame retardants, such as tris(2,3-dichloropropyl) phosphate, leach severely from the fiber into the spin bath. The compatbility of the halongated aliphatic acid esters with the acrylonitrile polymer fibers may help with retention in addition to rendering the fibers of higher quality.

It has also been found that the halongated aliphatic acid esters of this invention are useful as plasticizers for acrylonitrile polymers when used in combination with well known acrylonitrile polymer solvents such as dimethylacetamide, dimethylformamide, dimethyl sulfoxide, acetonitrile, diethyl phosphite, nitromethane and the like. This plasticizing effect may be achieved by using from 2 to 30 percent halogenated aliphatic acid ester based on fiber weight depending on the amount of flexibility desired. Best results are obtained with 5 to 20 percent plasticizer based on fiber weight. Because of their high retention in the fiber, the halogenated aliphatic acid esters provide a means for decreasing fiber brittleness and increasing flex life.

The following examples are presented as a further disclosure and illustration of the improved products of this invention and are not intended as a limitation thereof. In the examples all parts, proportions and percentages are by weight unless otherwise indicated.

In order to determine the extent of improvement in flame resistance of fibers and filaments treated in accordance with the present invention, the so-called "match and pill" test was employed in the examples. In this test, a swatch of carpet fabric measuring measuring 8 inches by 10 inches is placed in a draft-free enclosure. Ten safety paper-type matches are ignited one at a time and placed randomly on the surface of the carpet. The test is repeated in an exposed area. The resistance of the test sample to flame is expressed as that percentage of the ten matches from which flame propagation did not occur. A test rating of 100 percent non-burning indicates that all of the ignited matches failed to propagate flame. Two "pills" (hexamethylenetetramine) are then placed on the carpet and ignited. If the carpet does not burn, it is reported to pass the "pill test."

EXAMPLE I

Into a resin flask was measured 2250 gm. of dimethyl acetamide, 15 gm. of antimony trioxide and 146.25 gm. of methyl pentachlorostearate. The mixture was chilled to −15° C. and 589 gm. of an acrylic copolymer containing 6.5 percent vinyl acetate and 93.5 percent acrylonitrile added to form a uniform slurry. The slurry was transferred to a 90° C. oil bath and heated with mixing to 80° for 20 minutes. The resulting polymer solution which was obtained was found to be homogeneous by both visual and microscopic examination with only the small amount of antimony trioxide remaining as a separate phase. The polymer solution was transferred to a spinning apparatus and wet spun into an acrylic fiber by conventional wet spinning procedures using a coagulation bath consisting of 58 percent dimethylacetamide and 42 percent water at room temperature. A cross-section of the spun fiber showed that a homogeneous fiber had been obtained. Chemical analysis indicated that, based on the analysis for chlorine, more than 98.5 percent of the additive had been retained in the fiber when spun. A carpet sample of this fiber was tested and found to be 100 percent flame resistant using the match and pill flame test.

EXAMPLE II

Following the procedure of Example I, a spinning solution or "dope" was prepared with glycerol tripentachlorostearate used in place of the flame retardant of Example I. In this example, 24.51 percent of the acrylic polymer in Example I was used, 72 percent dimethyl acetamide solvent, 2.86 percent chlorinated triglycerol stearate (3.5 percent chlorine based on the fiber weight), 0.56 antimony trioxide and 0.07 dibutyltin oxide. The resulting dope was homogeneous except for the easily distinguished insoluble antimony trioxide dispersed throughout the dope. The sample was spun into a fiber using the spinning conditions similar to those described in Example I and analysis indicated that approximately 95 percent of the stabilizer was retained.

EXAMPLE III

Using the same polymer and procedure of Example I, methyl octachlorostearate was incorporated into the spin dope and spun into a fiber using the same techniques employed as in Example I. The dope preparation was carried out using the following amounts of the various ingredients: 23.34 percent polymer, 72 percent solvent, 4.03 percent methyl octachlorostearate (7.0 percent chlorine based on fiber weight), 0.56 percent antimony trioxide and 0.07 percent dibutyltin oxide. An analysis indicated that retention of the retardant was quantitative. A surprising development in this example was the unexpected improvement in color of the more highly chlorinated methyl stearate. The color of the sample containing methyl octachlorostearate was considerably better than that of the sample containing methyl pentachlorostearate in Example I. This improvement in color was carried over the fiber color as is shown below.

*Table I*

| Additive | Annealed Staple Color | |
|---|---|---|
| | Brightness | Purity |
| Methyl pentachlorostearate | 81.6 | 9.0 |
| Methyl octachlorostearate | 86.0 | 7.9 |

EXAMPLE IV

Methyl octachlorolaurate was added to a spinning solution and spun into fiber using the same technique employed in Example I. The following quantities of the various ingredients were used: 23.8 percent acrylic polymer, 72 percent solvent, 3.57 percent methyl octachlorolaurate (7.0 percent chlorine based on fiber weight), 0.56 percent antimony trioxide, 0.07 percent dibutyltin oxide. The fiber was spun in the manner reported for Example I and a cross-section of the fiber indicated that the methyl octachlorolaurate was compatible with the acrylic polymer and that the fiber was homogeneous. This laurate was surprisingly free of color and the liquid was similar to water in color. However, the improved color of the methyl octachlorolaurate was not carried over to the fiber in this case. An analysis of the spun fiber indicated that the methyl octachlorolaurate was essentially quantitatively retained.

EXAMPLE V

Methyl decachlorolaurate was added to a spinning solution and spun into fiber following the procedure and using the acrylic polymer in Example I. The following quantities were used: 24.26 percent acrylic polymer, 72 percent solvent, 3.11 percent methyl decachlorolaurate (7.0 percent chlorine based on fiber weight), 0.56 percent antimony trioxide and 0.07 dibutyltin oxide. A cross-section of the fiber spun in this example indicated the fiber was homogeneous and a visual examination indicated that the color was approximately the same as the methyl octachlorolaurate was essentially quantatively retained.

EXAMPLE VI

This example illustrates the plasticizing effect that may be achieved by using the halogenated aliphatic acid esters of this invention. A spinning solution was prepared by adding 148 grams of methyl pentachlorostearate to 2665 grams of dimethylacetamide, chilling the mixture to −10° C. and adding 987 grams of an acrylonitrile copolymer containing 93.5 percent acrylonitrile and 6.5 percent vinyl acetate. The mixture was heated and mixed at 80° C. for 25 minutes. The resulting solution contained 13 percent plasticizer based on total solids weight. Fibers spun from this plasticized spinning solution by dry-jet wet spinning using standard procedures had acceptable tensile properties and improved flex life as shown by the following table.

*Table II*

| Plasticizer | Percent Added | Flex-life-MIT Testor (average) |
|---|---|---|
| Control | | 70 |
| Methyl pentachlorostearate | 13 | 1,725 |
| Methyl decachlorolaurate | 13 | 216 |

When the above examples are repeated with other flame retarding agents as disclosed in this invention, similar results are obtained. The fibers produced from the compositions of this invention are flame retardant and yet remain homogeneous. The homogeneity of the compositions of this invention is of particular importance in view of the fact that the majority of halogen containing materials are not compatible with either acrylic polymers or copolymers. This lack of compatibility is displayed as the formation of heterogeneous solutions and generally result in the production of fibers with poorer qualities than a similar homogeneous fiber. This invention presents a flame retardant which has been found to be compatible in all types of acrylic fibers.

The foregoing detailed description has been given for clearness of understanding only, and unnecessary limitations are not to be construed therefrom. The invention is not to be limited to the exact details shown and described since obvious modifications will occur to those skilled in the art, and any departure from the description

What is claimed is:

1. A new composition of matter consisting essentially of acrylonitrile polymer containing at least 70 percent acrylonitrile and from 0.5 to 8 percent by weight of a halogenated aliphatic acid ester having the general formula

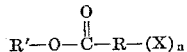

wherein R' is an aliphatic radical of from 1 to 8 carbon atoms, R is an alkylene radical of from 8 to 22 carbon atoms, X is selected from the group consisting of chlorine and bromine and n is an integer of from 2 through 10.

2. A new composition of matter consisting essentially of an acrylonitrile polymer, containing at least 70 percent acrylonitrile, a solvent therefor, and from 0.5 to 8 percent, based on the weight of the solution, of a halogenated aliphatic acid ester having the general formula

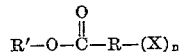

wherein R' is an aliphatic radical of from 1 to 8 carbon atoms, R is an alkylene radical of from 8 to 22 carbon atoms, X is selected from the group consisting of chlorine and bromine and n is an integer of from 2 through 10.

3. The composition of matter of claim 2 wherein the acrylonitrile polymer is polyacrylonitrile.

4. The composition of matter of claim 2 wherein the acrylonitrile polymer is a copolymer of at least 80 percent acrylonitrile and up to 20 percent of a copolymerizable mono-olefinic monomer.

5. The composition of matter of claim 2 wherein the acrylonitrile polymer consists of a blend of 80 to 90 percent of (A) a copolymer containing 80 to 98 percent acrylonitrile and 2 to 20 percent of another mono-olefinic monomer and 1 to 20 percent of (B) a copolymer containing 10 to 70 percent acrylonitrile and 30 to 90 percent of a vinyl-substituted tertiary heterocyclic amine, said blend having an overall vinyl-substituted tertiary amine content of 2 to 10 percent based on the weight of the blend.

6. The composition of matter of claim 2 wherein the halogenated aliphatic acid ester is methyl decachlorolaurate.

7. The composition of matter of claim 2 wherein the halogenated aliphatic acid ester is methyl octachlorolaurate.

8. The composition of matter of claim 2 wherein the halogenated aliphatic acid ester is methyl pentachlorostearate.

9. The composition of matter of claim 2 wherein the halogenated aliphatic acid ester is glycerol tripentachlorostearate.

10. The composition of matter of claim 2 wherein the halogenated aliphatic acid ester is methyl octachlorostearate.

11. A new composition of matter consisting essentially of an acrylonitrile polymer containing at least 80 percent acrylonitrile and up to 20 percent vinyl acetate, a solvent therefor, and from 0.5 to 8 percent, based on the weight of the solution, of a halogenated aliphatic acid ester having the general formula

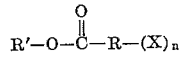

wherein R' is an aliphatic radical of from 1 to 8 carbon atoms, R is an alkylene radical of from 8 to 22 carbon atoms, X is selected from the group consisting of chlorine and bromine and n is an integer of from 2 through 10.

12. A process for the preparation of flame resistant acrylonitrile polymer fibers comprising mixing an acrylonitrile polymer containing at least 70 percent acrylonitrile with from 0.5 to 8 percent by weight of a halogenated aliphatic acid ester having the general formula

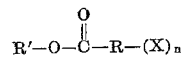

wherein R' is an aliphatic radical of from 1 to 8 carbon atoms, R is an alkylene radical of from 8 to 22 carbon atoms, X is selected from the group consisting of chlorine and bromine and n is an integer of from 2 through 10 in the presence of a solvent for the acrylonitrile polymer and thereafter extruding the acrylonitrile polymer halogenated aliphatic acid ester containing solution at a temperature of from 30 to 100° C. to form a flame resistant acrylonitrile polymer fiber containing from 4 to 20 percent halogenated aliphatic acid ester, based on the weight of the fiber.

13. The process defined in claim 12 wherein the acrylonitrile polymer is polyacrylonitrile.

14. The process defined in claim 12 wherein the acrylonitrile polymer is a copolymer of at least 80 percent acrylonitrile and up to 20 percent of a copolymerizable mono-olefinic monomer.

15. The process defined in claim 12 wherein the acrylonitrile polymer consists of a blend of 80 to 99 percent of (A) a copolymer containing 80 to 98 percent acrylonitrile and 2 to 20 percent of another mono-olefinic monomer and 1 to 20 percent of (B) a copolymer containing 10 to 70 percent acrylonitrile and 30 to 90 percent of a vinyl-substituted tertiary heterocyclic amine, said blend having an overall vinyl-substituted tertiary amine content of 2 to 10 percent based on the weight of the blend.

16. The process defined in claim 12 wherein the halogenated aliphatic acid ester is methyl decachlorolaurate.

17. The process defined in claim 12 wherein the halogenated aliphatic acid ester is methyl octachlorolaurate.

18. The process defined in claim 12 wherein the halogenated aliphatic acid ester is methyl pentachlorostearate.

19. The process defined in claim 12 wherein the halogenated aliphatic acid ester is glycerol tripentachlorostearate.

20. The process defined in claim 12 wherein the halogenated aliphatic acid ester is methyl octachlorostearate.

21. A fiber comprising an acrylonitrile polymer containing at least 70 percent acrylonitrile and from 4 to 20 percent, based on the weight of the fiber, of a halogenated aliphatic acid ester having the general formula

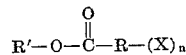

wherein R' is an aliphatic radical of from 1 to 8 carbon atoms, R is an alkylene radical of from 8 to 22 carbon atoms, X is selected from the group consisting of chlorine and bromine and n is an integer of from 2 through 10.

22. The fiber of claim 21 wherein the halogenated aliphatic acid ester is methyl decachlorolaurate.

23. The fiber of claim 21 wherein the halogenated aliphatic acid ester is methyl octachlorolaurate.

24. The fiber of claim 21 wherein the halogenated aliphatic acid ester is methyl pentachlorostearate.

25. The fiber of claim 21 wherein the halogenated aliphatic acid ester is methyl pentabromostearate.

26. The fiber of claim 21 wherein the halogenated aliphatic acid ester is methyl octachlorostearate.

References Cited by the Examiner

UNITED STATES PATENTS 2,524,528  10/50  Johnson _____ 260—487
2,881,147  4/59   Graham _____ 260—30.6

FOREIGN PATENTS 12,432  10/46  Australia.

MORRIS LIEBMAN, *Primary Examiner.*